Sept. 16, 1941.  G. W. BARNES  2,256,133
REFRACTIVE EQUALIZER
Filed Oct. 26, 1940
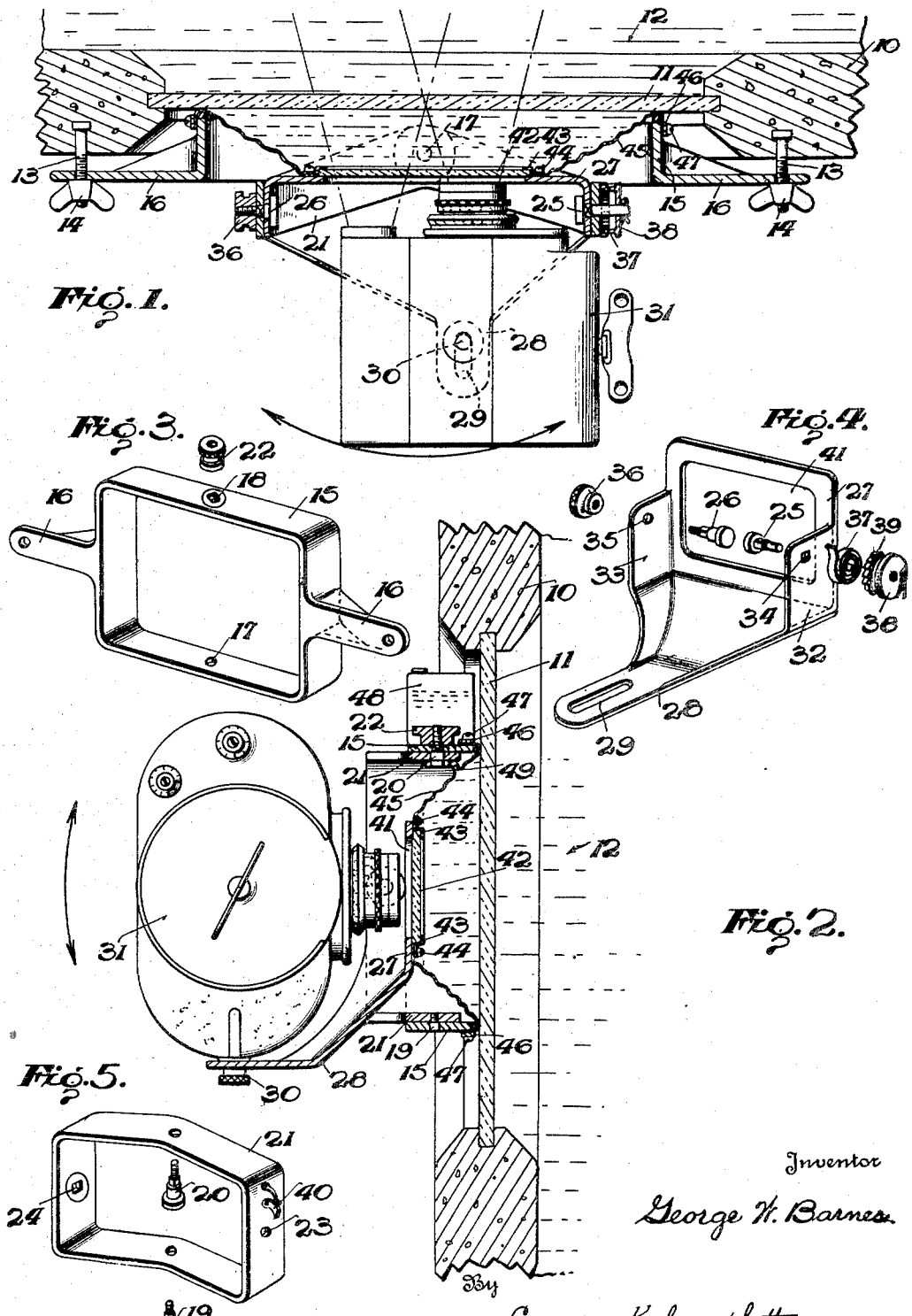
Inventor
George W. Barnes.
By
Cameron, Kerkam & Sutton Attorneys Patented Sept. 16, 1941

2,256,133

UNITED STATES PATENT OFFICE 2,256,133

REFRACTIVE EQUALIZER

George W. Barnes, Clifton Heights, Pa., assignor to E. R. Fenimore Johnson, Moorestown, N. J.

Application October 26, 1940, Serial No. 363,050

15 Claims. (Cl. 95—11)

This invention relates to refractive equalizers and more particularly to improvements in refractive equalizers for viewing or photographing submerged objects.

Heretofore much difficulty has been encountered in viewing or photographing submerged objects through windows in diving bells, aquariums or the like since the window is the boundary between two media having different indices of refraction. This difficulty is, of course, reduced to the minimum when the focal line is perpendicular to the plane of the window but when the focal line is at an angle to the plane of the window then both distortion and aberration are introduced and the resulting views or photographs are blurred and indefinite. For this reason, then, it is necessary that the focal line be kept perpendicular to the plane of the window to obtain clear and distinct views or photographs and it is accordingly impossible to follow movement of the object being photographed.

Heretofore various means have been suggested to overcome the distortion and aberration present when the focal line is at an angle to the plane of the window such as the use of movable turret-type windows, but all of these means have proved too cumbersome and expensive.

The present invention provides a novel refractive equalizer wherein the focal line is maintained perpendicular to the plane of an auxiliary window moving with the viewer or camera. Between this auxiliary window and the window in the diving bell, aquarium or the like, means are provided for retaining a medium having substantially the same index of refraction as the medium in which the object being viewed or photographed is submerged. The camera can be manipulated or the viewer follow any movement of the object being photographed and as the auxiliary window follows the movement of the camera or viewer and as its plane is perpendicular to the focal line, no aberration or distortion is introduced even though the focal line may be at an angle to the plane of the window in the diving bell or the aquarium.

It is accordingly an object of the present invention to provide a novel refractive equalizer for viewing or photographing submerged objects in which the focal line is at all times maintained perpendicular to the plane of an auxiliary window so that distortion and aberration are reduced to a minimum.

Another object of the present invention is to provide a novel refractive equalizer for viewing or photographing submerged objects in which the camera or viewer may move at will to follow any movement of the object being photographed without introducing distortion and aberration.

Another object of the present invention is to provide a novel refractive equalizer for viewing or photographing submerged objects in which an auxiliary window is employed arranged for movement with respect to the window through which the object is to be viewed or photographed, the auxiliary window being so arranged that its plane remains perpendicular to the focal line, a medium having substantially the same index of refraction as that containing the object being viewed or photographed being interposed between the auxiliary window and the window so that distortion and aberration are reduced to a minimum.

The refractive equalizer of the present invention is susceptible of materialization in many embodiments both for visual and for photographic use. For the sake of simplicity an illustrative embodiment of the refractive equalizer of the present invention is shown in the accompanying drawing and is hereafter described for photographic use only. It is to be expressly understood that this illustrative embodiment of the present invention is shown and described for the purposes of illustration only since the invention is capable of visual use and it is not to be construed as a limitation of the present invention. To determine the scope of the present invention reference should be had to the appended claims.

In the accompanying drawing,

Fig. 1 is a top view, partly in section, showing an illustrative embodiment of the novel refractive equalizer of the present invention;

Fig. 2 is a vertical view partly in section of the illustrative embodiment of the present invention as shown in Fig. 1;

Fig. 3 is a view of a portion of the illustrative embodiment of the present invention as shown in Fig. 1;

Fig. 4 is a view of another part of the illustrative embodiment of the present invention as shown in Fig. 1; and Fig. 5 is a view of another part of the illustrative embodiment of the present invention shown in Fig. 1.

In the several figures, in which like reference characters indicate similar parts, 10 is the wall of a diving bell, aquarium or the like having therein a suitable window 11 through which it is desired to photograph objects contained in the surrounding medium 12. Walls 10 are provided with suitable bolts 13 disposed on opposite sides of window 11, bolts 13 being designed to receive suitable wing nuts 14. A suitable frame 15 is designed for close engagement with window 11 and is provided with arms 16 adapted to engage bolts 13 and be secured against window 11 by wing nuts 14. Frame 15 is provided with oppositely and vertically disposed openings 17 and 18, opening 17 being designed to receive a suitable pivot pin 19 (Fig. 5) and opening 18 being designed to receive a suitable pivot pin 20.

A second frame 21 is provided for rotation about pivots 19 and 20 within frame 15, frame 21 first being mounted upon pivot 19 and then having pivot 20 inserted and secured in place by a suitable nut 22 (Fig. 3). Frame 21 is provided with oppositely and horizontally disposed openings 23 and 24 designed to receive pivot pins 25 and 26 respectively (Fig. 4).

A third frame 27 (Fig. 4) is provided having a downwardly and outwardly extending arm 28. Arm 28 is suitably slotted, as at 29, to receive a suitable bolt 30 by which any suitable camera 31 is secured to arm 28. Frame 27 is provided with oppositely disposed extensions 32 and 33 which are provided with oppositely and horizontally disposed openings 34 and 35 adapted to receive pivot pins 25 and 26 respectively. Frame 27 is so proportioned that it fits within frame 21 and can be rotated about the horizontal pivots 25 and 26, a suitable nut 36 securing pivot 26 in place. Pivot 25 is provided with a coil spring 37 and a nut 38 having ratchet teeth 39 designed to engage a dog 40 mounted on frame 21 so that by the rotation of nut 38 spring 37 can be tensioned to counterbalance the weight of camera 31.

Frame 27 is provided with a suitable aperture 41 covered by a suitable transparent window 42 secured to frame 27 by molding 43 and screws 44. Clamped beneath molding 43 and forming a fluid-tight seal with frame 27 and extending completely around opening 41 and between the inner edges of frame 15 and window 11 to form a fluid-tight seal and secured to frame 15 by beading 46 and screws 47 is a flexible, expansible and contractible bellows-like member 45. Mounted upon frame 15 is a suitable reservoir 48 communicating, as at 49, with the interior of member 45. The interior of member 45 is filled with a medium having substantially the same index of refraction as the medium 12 through reservoir 48 which acts as an overflow tank to receive fluid when member 45 is distorted by the motion of window 42 and camera 31. Camera 31 is so mounted on arm 28 that its focal line is perpendicular to window 42.

With the embodiment of the present invention set up as above described it will now be apparent that camera 31 can be rotated in vertical planes about pivots 25 and 26 and can be rotated in horizontal planes about pivots 19 and 20 while at all times maintaining its focal line perpendicular to the window 42. Inasmuch as the mediums outside window 11 and between window 11 and window 42 have substantially the same indices of refraction and as the focal line of camera 31 is always perpendicular to window 42, distortion and aberration are reduced to a minmum no matter what the angle of the focal line of camera 31 may be with respect to the plane of window 11.

It will now be apparent that the present invention provides a novel refractive equalizer for viewing or photographing submerged objects in which aberration and distortion are reduced to a minimum by maintaining the focal line perpendicular to the plane of an auxiliary window, a medium having substantially the same index of refraction as that containing the object being photographed being interposed between the auxiliary window and the window in the diving bell, aquarium or the like.

To those skilled in the art changes to or modifications of the above described illustrative embodiment of the present invention may now be suggested without departing from the concept of the present invention. For example, for visual use the camera of the above described illustrative embodiment may be omitted and in its place a suitable face-hood may be fixed to the arm 28 so that the focal line of the user is perpendicular to the auxiliary window 42. It is further apparent that the refractive equalizer of the present invention can as well be used on curved or hemispherically shaped windows as well as on the flat window shown and described above. In this case the expansible and contractible member 45 may enclose the curved or hemispherical shaped window and be fixed to the wall of the aquarium or diving bell. In some instances the illustrative embodiment of the invention described above may be simplified by having the auxiliary window secured to or mounted within the camera and the expansible and contractible member fixed to the body of the camera and to the transparent medium through which the object is being observed. In this latter instance the expansible and contractible member might be provided with a suction ring having an evacuation pump so that the device may be readily secured to any window through which the object is to be observed. It is further to be understood that it is within the scope of the present invention to incorporate, if desired, suitable coloring matter in the medium within the expansible and contractible member to filter the light rays as for example when taking natural color pictures. To determine the scope of the present invention, therefore, reference should be had to the appended claims.

What is claimed is:

1. In a refractive equalizer for photographing objects through a boundary between a medium in which the objects are contained and another medium of a different index of refraction, a window opposite said boundary, a camera having its focal line perpendicular to the plane of said window, means providing two degrees of rotational freedom for said window and said camera with respect to said boundary and means maintaining a medium having substantially the same index of refraction as the medium containing the objects between the boundary and said window.

2. In a refractive equalizer for viewing or photographing objects through a boundary between the medium in which they are contained and another medium of different index of refraction, a window arranged opposite said boundary having its plane perpendicular to the visual focal line, means providing said window with rotational freedom and means maintaining a medium between the boundary and said window having substantially the same index of refraction as the medium containing the objects.

3. In a refractive equalizer for viewing or photographing submerged objects through a window, an auxiliary window having its plane perpendicular to the visual focal line arranged opposite said window, means providing said auxiliary window with rotational freedom and means maintaining a medium between the window and said auxiliary window having substantially the same index of refraction as that containing the objects.

4. In a refractive equalizer for viewing or photographing submerged objects through a window, an auxiliary window free to move in front of the window and having its plane perpendicular to the visual focal line, and means maintaining a medium having substantially the same index of refraction as that containing the objects between the window and said auxiliary window.

5. In a refractive equalizer for viewing or photographing submerged objects through a window, an auxiliary window free to move in front of the window and having its plane perpendicular to the visual focal line, and means maintaining a light filtering medium having substantially the same index of refraction as that containing the objects between the window and said auxiliary window.

6. In a device for photographing submerged objects including a camera and a window through which the photograph is to be taken, an auxiliary window arranged for movement opposite the first named window, means maintaining the focal line of the camera perpendicular to the plane of said auxiliary window and means maintaining a medium having substantially the same index of refraction as that of the medium containing the object being photographed between the first named window and said auxiliary window.

7. In a device for photographing submerged objects through a window, an auxiliary window, means mounting said auxiliary window opposite the first named window for movement relative to the first named window, means maintaining a medium having substantially the same index of refraction as that containing the object being photographed between the window and said auxiliary window and camera mounting means secured to said auxiliary window so constructed and arranged that the focal line of the camera is maintained perpendicular to the plane of said auxiliary window.

8. In a device for photographing submerged objects through a window, an auxiliary window, means mounting said auxiliary window opposite the first named window for movement in horizontal and vertical planes, resilient expansible and contractible means between said auxiliary window and the first named window containing a medium having substantially the same index of refraction as that containing the object being photographed and camera mounting means secured to said auxiliary window so constructed and arranged that the focal line of the camera is maintained perpendicular to the plane of said auxiliary window.

9. In a device for photographing submerged objects through a window, an auxiliary window, means mounting said auxiliary window opposite the first named window for movement, resilient expansible and contractible means between said auxiliary window and the first named window, a reservoir opening into said resilient expansible and contractible means to supply a medium to the interior of said expansible and contractible means having substantially the same index of refraction as that containing the object being photographed and affording an overflow receiver when said expansible and contractible means is distorted and camera carrying means secured to said auxiliary window so constructed and arranged that the focal line of the camera is maintained perpendicular to the plane of said auxiliary window.

10. In a device for photographing submerged objects through a window, a frame secured to said window, an auxiliary window, pivot means carried by said frame supporting said auxiliary window, a resilient expansible and contractible member carried by said frame and surrounding said auxiliary window, a fluid having substantially the same index of refraction as that containing the object being photographed within said resilient expansible and contractible member and camera supporting means secured to said auxiliary window so constructed and arranged that the focal line of the camera is maintained perpendicular to the plane of said auxiliary window.

11. In a device for photographing submerged objects through a window, a frame secured to said window, a second frame mounted on vertical pivots within said first named frame, an auxiliary window mounted on horizontal pivots withing said second named frame, resilient expansible and contractible means surrounding said auxiliary window and secured to said first named frame containing a medium having substantially the same index of refraction as that containing the object being photographed and camera mounting means secured to said auxiliary window and so constructed and arranged that the focal line of the camera is maintained perpendicular to the plane of said auxiliary window.

12. In a device for photographing objects under water through a window, a frame secured to the window, a second frame mounted upon vertical pivots within said first named frame, a third frame mounted uopn horizontal pivots within said second named frame, an auxiliary window secured to said third named frame, resilient expansible and contractible means surrounding said auxiliary window and secured to said first named frame containing a medium having substantially the same index of refraction as the water containing the object being photographed and camera supporting means secured to said third named frame so constructed and arranged that the focal line of the camera is maintained perpendicular to the plane of said auxiliary window.

13. In a device for the photographing of objects under water through a window, a frame secured to the window, a second frame mounted on vertical pivots within said first named frame, a third frame mounted on horizontal pivots within said second named frame, camera mounting means secured to said third named frame, adjustable resilient means coacting between said second named and said third named frames to counterbalance the weight of the camera on said camera mounting means, an auxiliary window carried by said third named frame, resilient expansible and contractible means forming a fluid-tight seal about said auxiliary window and secured to and forming a fluid-tight seal with said first named frame, a medium having substantially the same index of refraction as that containing the object being photographed within said resilient expansible and contractible means, said auxiliary window and said camera mounting means being so constructed and arranged that the focal line of the camera is maintained perpendicular to the plane of said auxiliary window.

14. In a device for photographing submerged objects through a window, an auxiliary window, means mounting said auxiliary window opposite the first named window, resilient expansible and contractible means between said auxiliary window and the first named window, a medium having substantially the same index of refraction as that containing the object being photographed within said resilient expansible and contractible means, camera carrying means secured to said auxiliary window so constructed and arranged that the focal line of the camera is manitained perpendicular to the plane of said auxiliary window and adjustable resilient means to counterbalance the weight of the camera on said camera carrying means.

15. In a device for the photographing of objects under water through a window, a frame secured to the window, a second frame mounted on vertical pivots within said first named frame, a third frame mounted on horizontal pivots within said second named frame, camera mounting means secured to said third named frame, adjustable resilient means coacting between said second named and said third named frames to counterbalance the weight of the camera on said camera carrying means, an auxiliary window carried by said third named frame, resilient expansible and contractible means forming a fluid-tight seal about said auxiliary window and secured to and forming a fluid-tight seal with said first named frame and a reservoir opening into said resilient expansible and contractible means to supply a medium to the interior of said expansible and contractible means having substantially the same index of refraction as that of the object being photographed and affording an overflow receiver when said expansible and contractible means is distorted, said auxiliary window and said camera mounting means being so constructed and arranged that the focal line of the camera is maintained perpendicular to the plane of said auxiliary window.

GEORGE W. BARNES.